March 8, 1949.  J. B. JENKINS  2,464,136
BELLOWS SEAL

Filed Oct. 31, 1945  2 Sheets-Sheet 1

Inventor:
John B. Jenkins.
By
John Darley
Attorney.

March 8, 1949.    J. B. JENKINS    2,464,136
BELLOWS SEAL

Filed Oct. 31, 1945    2 Sheets-Sheet 2

Inventor:
John B. Jenkins.
By
John Darley
Attorney.

Patented Mar. 8, 1949

2,464,136

UNITED STATES PATENT OFFICE 2,464,136

BELLOWS SEAL

John B. Jenkins, Rockford, Ill., assignor to Twin Disc Clutch Company, Racine, Wis., a corporation of Wisconsin Application October 31, 1945, Serial No. 625,848

5 Claims. (Cl. 286—11)

My invention relates to bellows seal and more particularly to an improved method of attaching the bellows member to the end pieces of the seal.

In seals of this type, a characteristic arrangement comprises a bellows whose opposite ends are secured to a carrier ring which is ordinarily fixedly connected to one of the parts being sealed, and to a packing ring which yieldingly and sealingly contacts a mating ring supported by another part being sealed. Generally, the ends of the bellows are soldered to the carrier and packing rings and where the seal is exposed to a temperature higher than can be withstood by the low melting point, lead and tin solders, it is necessary to employ the so-called high melting point solders. The use of the latter solders, however, creates new difficulties, because not only are they more difficult to work, but the high temperature of soldering sets up stresses in the packing ring, whether hardened before or after soldering, which affects the smooth, sealing surface of the packing ring and prevents it from satisfactorily performing its primary function.

It is therefore one object of my invention to provide a bellows seal in which the ends of the bellows are fixed in relation to the carrier and packing rings by means of elastic members, such as rubber rings.

A further object is to provide a bellows seal of the character indicated for use under conditions in which the pressure external of the bellows is higher than the pressure within the bellows, and in which the external pressure maintains sealing contact between the elastic members and the bellows and packing and carrier rings, respectively.

These and further objects of the invention will be set forth in the following specification, reference being had to the accompanying drawings, and the novel means by which said objects are effectuated will be definitely pointed out in the claims.

Figure 1:
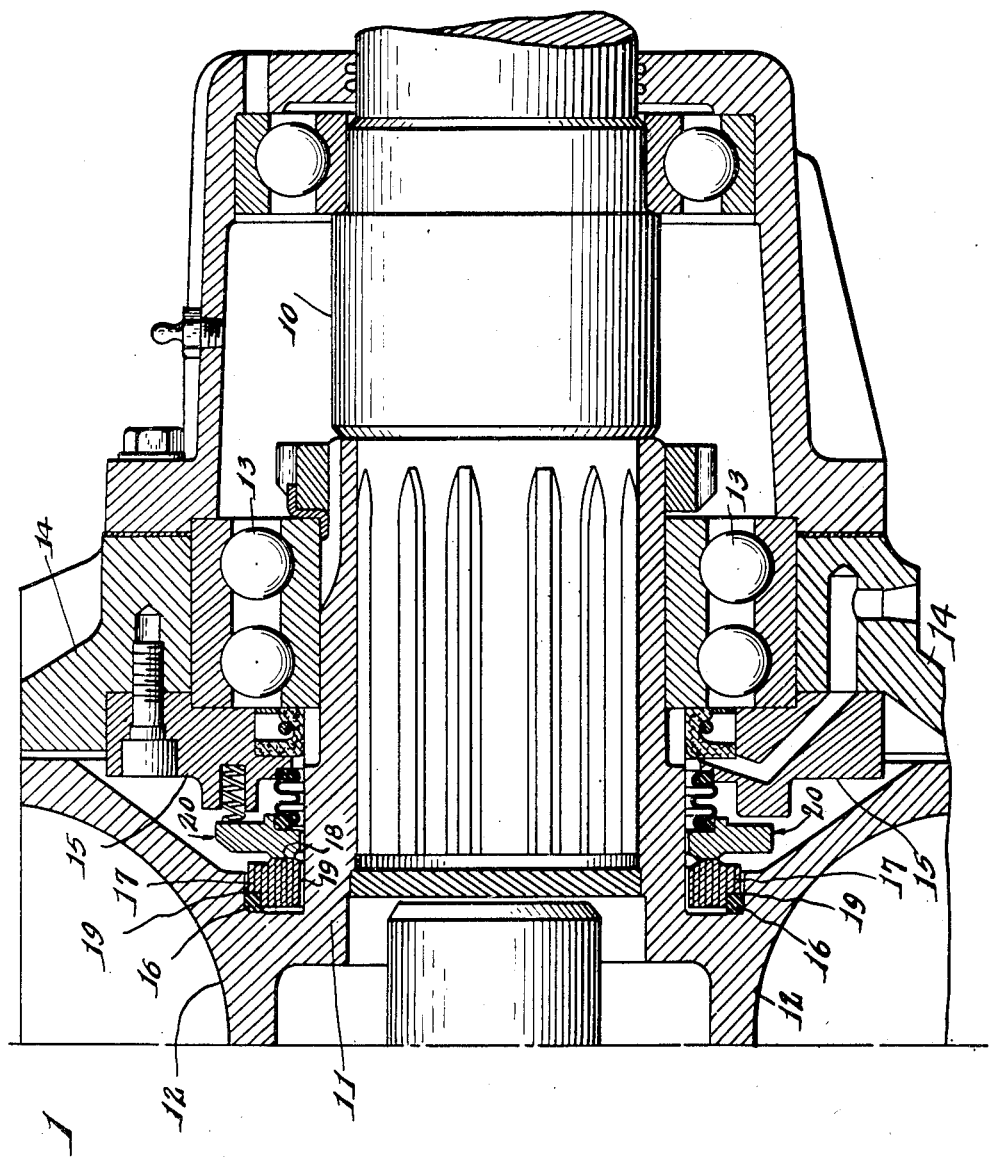
Fig. 1 is a fragmentary, sectional elevation of a hydraulic torque converter equipped with one of my improved seals.

Referring to Fig. 1 of the drawings, there is illustrated a portion of a hydraulic torque converter which exemplifies the use and operation of the seal. The numeral 10 designates the driven or output shaft which is splinedly connected to the sleeve hub 11 of a turbine member 12 of the converter. The hub 11 is journaled in a bearing 13 carried by the converter housing 14 and secured to an inner face of the housing is a carrier ring 15 which encircles the hub. Annularly recessed in the external surface of the turbine 12 adjacent the hub is a cushion ring 16 and floatingly mounted thereon in encircling relation to the hub is a mating ring 17 having a ground face 18 that is opposed to and spaced from the carrier ring 15, the mating ring being transversely backed by the cushion ring 16 with clearance between the turbine and the peripheral and inner faces of the ring 17, as indicated by the numerals 19—19. The mating ring is preferably molded from carbon or a similar material that is capable of being ground to a smooth surface and will wear evenly without pitting.

Disposed between the carrier ring 15 and the mating ring 17 is the improved bellows seal, generally indicated by the numeral 20, which encircles the sleeve hub 11 in spaced relation thereto. It will be understood that a similar seal may be employed between the housing 14 and the pump or impeller member (not shown) of the converter. The seal 20 is more particularly shown in Fig. 2 to which reference will now be made.

One side of a packing ring 21 is provided with an annular face 22 which sealingly contacts the face 18, while the opposite side is counterbored at 23 to receive a rubber ring 24 whose peripheral surface 25 and a side surface 26 closely fit and abut, respectively, the surfaces of the counterbore. The other side surface 27 of the ring 24 abuts a transverse portion 28 of one end fold of a cylindrical bellows 29, while the adjacent, annular, end lip 30 of the bellows is angularly disposed to the portion 28 and conforms to the inner surface 31 of the ring 24. In cross sectional outline, thereof, the ring 24 is generally V-shaped.

The bellows 29 may possess as many folds as operating conditions may require, but, in any case, at the opposite end fold, a transverse portion 32 and lip 33 partially embrace a rubber ring 34 that is seated in and closely fits a counterbore 35 provided in the carrier ring 15. The relation between the portion 32, lip 33 and ring 34 is identical with that existing between the portion 28, lip 30 and ring 24, and the rings 24 and 34 are also identical, but reversed in position as shown in Fig. 1.

Since the rubber rings 24 and 34 are not bonded to the bellows 29 and the carrier and packing rings 15 and 21, respectively, the effectiveness of the seal depends upon proper fit and relating the parts so as to utilize the pressure to which the seal is exposed, as a means for insuring and maintaining the primary function of the seal. Generally speaking, the seal is intended to operate under conditions in which the pressure external of the bellows is greater than the internal pressure. In the specific instance shown, the pressure externally of the bellows 29 is the hydraulic pressure within the converter, while the pressure within the bellows is that of the atmosphere.

Figure 2:
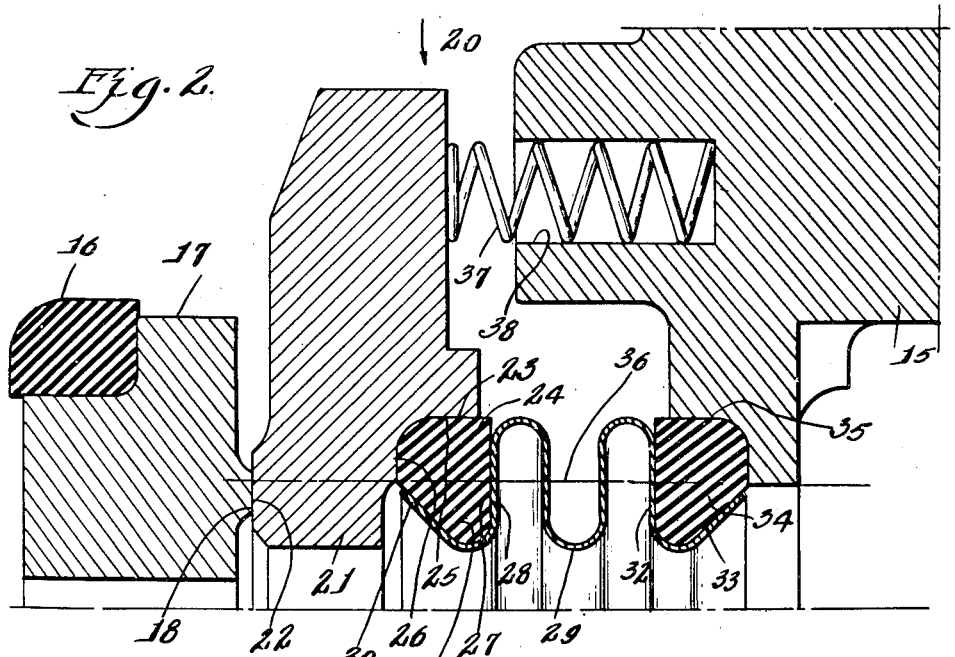
Fig. 2 is an enlarged, partial, sectional elevation of the seal shown in Fig. 1.

It has been determined experimentally that the converter hydraulic pressure on the bellows 29 is effective at about the mean diameter between the inside and outside bends of the bellows folds and this pressure line is indicated by the numeral 36 in Fig. 2. In the strictest sense, the annular center of pressure on the webs of the bellows folds lies slightly outward of the mean diameter of these folds, but utilization of the mean diameter factor for simplified calculations in seals of this type is sufficiently accurate for all practical purposes. This factor is utilized in conjuction with the well known action of a partially enclosed mass of rubber when exposed to a pressure to accomplish the desired result.

As shown in Fig. 2, the rubber rings 24 and 34 extend beyond the opposed faces of the packing and carrier rings 21 and 15, respectively, to thereby expose limited portions of the former rings to the hydraulic pressure in the space between the latter rings. Since the rings 24 and 34 are almost completely enclosed, they obey Pascal's law and transmit the hydraulic pressure applied to the exposed, limited portions of the rings undiminished in all directions and normal to the enclosing surfaces, thus causing the rubber rings 24 and 34 to sealingly contact the surfaces of the respective counterbores 23 and 35. To provide proper balance, it is important that the surface contacts of the rings 24 and 34 with the counterbores 23 and 35, respectively, do not extend inwardly of the cylindrical pressure boundary as represented by the line 36. This contact limit may coincide with the line 36, as shown in Fig. 2, or may be disposed outwardly thereof so as to insure that the pressure externally of the bellows will firmly and sealingly contact the rings 24 and 34 with the defining surfaces of their respective counterbores.

In assembling the seal, the rubber rings 24 and 34 are stretched to clear the extremities of the lips 30 and 33 and are seated to elastically grip these lips and abut the transverse portions 28 and 32, all respectively, as shown in Fig. 2. The rings 24 and 34 are then hand pressed into the counterbores 23 and 35, respectively, and thereafter, regardless of the converter pressure and due to the inherent characteristics of the arrangement, the several parts maintain their relative positions and sealingly contain the external pressure.

Where the bellows 29 is composed of brass or a copper alloy, the bellows acquires a permanent set and in order to maintain the packing ring 21 in sealing contact with the mating ring 17, the packing ring is constantly urged by a plurality of helical springs 37, each of which has one end seated in a pocket 38 provided in the carrier ring 15 and the opposite end abutting the packing ring. It is contemplated, however, that the bellows 29 may be made of stainless steel and may therefore be characterized by sufficient resiliency to eliminate the springs.

Figure 3:
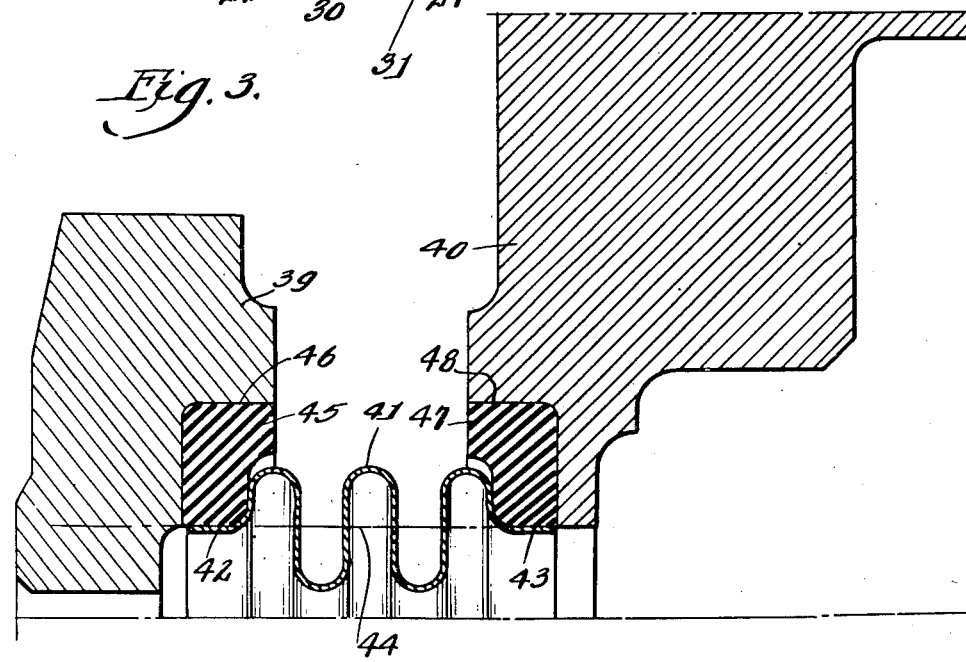
Fig. 3 is a view similar to Fig. 2, but showing a modified form of the seal.

In Fig. 3 is illustrated a variation wherein the numerals 39, 40 and 41 designate, respectively, a packing ring, a carrier ring and a bellows corresponding to the similar parts of the seal shown in Fig. 2. The annular lips 42 and 43 at the opposite ends of the bellows 41 are positioned to substantially coincide with the cylindrical pressure boundary diagrammatically indicated by the line 44. Where the folds of the bellows are symmetrically arranged, this line coincides with the median line between the outer and inner ends of the folds and the same condition holds true for the seal shown in Fig. 2.

A rubber ring 45, corresponding to the ring 24, grippingly encircles the lip 42 and is seated in a counterbore 46 in the packing ring 39, while a rubber ring 47, corresponding to the ring 34, grippingly encircles the lip 43 and is seated in a counterbore 48 in the carrier ring 40. This construction places the rings 45 and 47 outwardly of the line 44 and the seal therefore functions in the same manner as that shown in Fig. 2. Further, the modification provides a simpler shape for the ends of the bellows and reduces the area contact of the bellows with the rubber rings. Springs may be employed in this design in the same manner as that illustrated in Fig. 2.

I claim:

1. A cylindrical type seal for retaining a pressure externally of the seal that is higher than the pressure internally of the seal comprising a cylindrical bellows composed of a plurality of juxtaposed folds and having annular lips extending from the opposite ends thereof, a packing ring and a carrier ring adjacent opposite ends of the bellows, respectively, and an elastic ring encircling each lip in contact therewith and seated in counterbores provided in the packing and carrier rings, respectively, the contacts of the elastic rings with the counterbores not extending inwardly of the effective, cylindrical pressure boundary of the bellows.

2. A cylindrical type seal for retaining a pressure externally of the seal that is higher than the pressure internally of the seal comprising a cylindrical bellows composed of a plurality of juxtaposed folds and having annular lips extending from the opposite ends thereof, a packing ring and a carrier ring adjacent opposite ends of the bellows, respectively, and a rubber ring encircling each lip in contact therewith and seated in counterbores provided in the packing and carrier rings, respectively, the contacts of the rubber rings with the counterbores not extending inwardly of the effective, cylindrical pressure boundary of the bellows.

3. A cylindrical type seal for retaining a pressure externally of the seal that is higher than the pressure internally of the seal comprising a cylindrical bellows composed of a plurality of juxtaposed folds and having annular lips extending from the opposite ends thereof, a packing ring and a carrier ring adjacent opposite ends of the bellows, respectively, and an elastic ring encircling each lip in contact therewith and seated in counterbores provided in the packing and carrier rings, respectively, the contacts of the elastic rings with the counterbores not extending inwardly of the effective, cylindrical pressure boundary of the bellows and the annular lips being located to coincide with the pressure boundary.

4. A cylindrical type seal for retaining a pressure externally of the seal that is higher than the pressure internally of the seal comprising a cylindrical bellows composed of a plurality of juxtaposed folds and having annular lips extending from the opposite ends thereof, a packing ring and a carrier ring adjacent opposite ends of the bellows, respectively, and an elastic ring encircling each lip in contact therewith and an adjacent web of the bellows and seated in counterbores provided in the packing and carrier rings, respectively, the contacts of the elastic rings with the counterbores not extending inwardly of the effective, cylindrical pressure boundary of the bellows and each elastic ring having a limited portion exposed to the pressure external of the bellows and the remainder enclosed by the associated counterbore, lip and web.

5. A cylindrical type seal for retaining a pressure externally of the seal that is higher than the pressure internally of the seal comprising a cylindrical bellows composed of a plurality of juxtaposed folds and having annular lips extending from the opposite ends thereof, a packing ring and a carrier ring adjacent opposite ends of the bellows, respectively, and a rubber ring encircling and gripping each lip in contact therewith and seated in counterbores provided in the packing and carrier rings, respectively, the contacts of the rubber rings with the counterbores not extending inwardly of the effective, cylindrical pressure boundary of the bellows.

JOHN B. JENKINS.

REFERENCES CITED

The following references are of record in the file of this patent:

UNITED STATES PATENTS

| Number | Name | Date |
|---|---|---|
| 955,595 | Kingston et al. | Apr. 19, 1910 |
| 2,010,930 | Rowe | Aug. 13, 1935 |
| 2,270,651 | Doyle | Jan. 20, 1942 |